United States Patent Office 3,836,513
Patented Sept. 17, 1974

3,836,513
POLYMERIZATION OF CONJUGATED DIOLEFINS WITH ALFIN CATALYST AND MOLECULAR WEIGHT CONTROLLER
James B. Pyke, Akron, Ohio, assignor to The Goodyear Tire & Rubber Company, Akron, Ohio
No Drawing. Filed June 11, 1970, Ser. No. 45,544
Int. Cl. C08d 1/32, 3/06; C08f 19/08
U.S. Cl. 260—82.1       10 Claims

ABSTRACT OF THE DISCLOSURE

In a process for preparing a polymer of a conjugated diolefinic compound in the presence of an alfin catalyst consisting of an alkali metal halide, a sodium alkoxide and a sodium alkenyl compound, the improvement comprising polymerizing the conjugated diolefinic compound in the presence of at least one unsaturated organic halide to control the molecular weight of the polymer is disclosed.

---

This invention relates to the process of polymerizing unsaturated olefinic compounds and in particulaar to an improved process for the production of polymers from unsaturated olefinic compounds having controlled molecular weights. Specifically, the invention relates to the improved process of polymerizing unsaturated olefinic compounds, particularly conjugated diolefins, in the presence of an "alfin" catalyst and in the presence of a molecular weight modifier.

The polymerization of unsaturated olefinic compounds such as conjugated diolefins with or without co-monomers such as other conjugated diolefins or vinyl aromatics in the presence of alfin catalysts is well known. The use of "alfin" polymerization catalysts offers several distinct advantages. Generally, very high rates of reaction are obtained as are also very high yields. The polymers produced by polymerizing unsaturated olefinic compounds in the presence of alfin catalysts are known to possess a very high flex life, high tensile strength, high tear strength and excellent abrasion resistance. However, polymers produced by employing alfin catalysts also have one distinct disadvantage and that is the polymers usually have extremely high molecular weights, thus making the polymers very tough and hard to process and, therefore, not acceptable for use in conventional rubber plants. For this reason alfin catalyzed polymers have been commercially unattractive.

It is the object of this invention to provide a method by which the molecular weight of polymers formed by the polymerization of unsaturated olefinic compounds and/ or mixtures of unsaturated olefinic compounds and, thus, monomers copolymerizable therewith employing alfin catalysts, can be controlled. It is also another object of this invention to provide a novel process for the production of alfin polymerized rubbers having molecular weights which are more readily adaptable to processing.

As is mentioned above the use of alfin catalysts to polymerize conjugated diolefins is an old and well known process which results in polymers having molecular weights ranging from at least 2,000,000 to over 5,000,000 and, thus, not readily possible by conventional equipment and procedures. It is known that the alfin catalyst will produce polymers having inherent viscosities up to 50 deciliters per gram. It is also known that the inherent viscosity is an indication of the molecular weight of such a polymer.

A method has now been found whereby in the polymerization of a conjugated diolefin or mixtures of conjugated diolefins and other olefinic compounds, the molecular weight of these alfin polymerized polymers can be controlled so as to yield a commercially attractive polymer.

The invention comprises an improvement in the polymerization of unsaturated olefinic compounds, preferably conjugated diolefins or conjugated diolefins, in mixture with other vinyl aromatic compounds, such as styrene by means of alfin catalyst, while said unsaturated olefinic compounds are in the presence of a molecular weight modifier, such as unsaturated organic halides.

Representative of such unsaturated organic halides are vinyl chloride, vinyl bromide, 1-chloro-1-propene, 1-bromo-1-propene, 1-chloro-1-butene, 1-bromo-1-butene, 1-chloro-1-pentene, 1-bromo-1-pentene, 1-chloro-1-hexene, 1-bromo-1-hexene, 1-chloro-1-heptene, 1-bromo-1-heptene, 1-chloro-1-octene, 1-bromo-1-octene, and the like.

The amount of modifier employed depends on the extent of molecular weight reduction desired. In general, the amount of modifier employed will vary from about 0.001 parts per hundred monomer (phm.) to about 1.00 phm. A more preferred range is about 0.01 phm. to about 0.75 phm.

The amount of catalyst required to obtain good conversion of the conjugated diolefin compound to polymer generally ranges from about 0.5 parts per hundred monomer (phm.) to about 3.0 phm. A more preferred range of catalyst level is from about 0.75 phm. to about 1.5 phm.

Normally temperature and pressure are not critical in the practice of this invention. Successful results are obtained at temperatures ranging from about −20° C. to about 50° C. and at pressures varying from about 1 atmosphere to about 40 atmospheres. Generally it is preferred to carry out the polymerization or copolymerization at ambient temperature and pressure.

In the practice of this invention, four-ounce reaction vessels were dried and flushed with nitrogen. Monomer, modifier and catalyst were then added in that order once the bottles were placed in a 25° C. polymerization bath. Polymerization was allowed to proceed for two hours at the end of which time the catalyst was destroyed with an excess of isopropanol and the polymer cement dried in a vacuum oven.

In another embodiment of this invention monomer, catalyst and then modifier were charged to the reaction vessel in that order and the vessel placed in a 25° C. polymerization bath for 2 hours. The catalyst was then destroyed with an excess of isopropyl alcohol and the polymer dried under vacuum. No appreciable change in the viscosities of the two polymer samples was observed between these two procedures.

The process of this invention is well adapted to the polymerization of conjugated diolefins representative examples of which are butadiene, isoprene, 2-ethyl butadiene, 1,3-pentadiene and the like as well as to the co-polymerization of butadiene with isoprene or other pairs of these conjugated diolefins. The process is also well adapted to the polymerization and co-polymerization of other unsaturated olefinic compounds such as 2,3-dimethyl-1,3-butadiene, chloroprene and the like. It is also adaptable to the polymerization of copolymers of aryl olefins representative examples of which are styrene, alkyl styrenes, p-chloro styrene, p-methoxy styrene and the like with these conjugated diolefins. Vinyl ethers and other unsaturated hydrocarbons can also be polymerized by the method of this invention. By the use of the molecular weight techniques of this invention polymers of controlled molecular weight which can be processed on conventional equipment and by conventional techniques can be realized.

The polymerization or copolymerization of these reactants takes place in the presence of an alfin catalyst that is essentially a complex of a sodium alkenyl compound such as allyl sodium, a sodium alkoxide such as sodium isopropoxide and an alkali metal halide, such as sodium chloride.

PREPARATION OF ALFIN CATALYST

The alfin catalyst employed in the practice of this invention was prepared as follows:

Dry pentane (400 ml.) was charged to a 3-necked round bottom flask equipped with stirrer, nitrogen inlet, reflux condenser and an external cooling bath. To this was then added 1.4 moles of finely divided sodium. The slurry was cooled to about −10° C. and 0.74 moles of dry n-amyl chloride was slowly added with moderate stirring over a period of half an hour. Stirring was continued for another hour at the end of which time a slow addition of 0.35 moles of isopropyl alcohol was begun. Once addition of the isopropyl alcohol was complete and sufficient time was allowed for all of the alcohol to react, excess dry propylene was introduced to the mixture. The temperature of the reaction mixture was maintained at −10° C. until reflux of the propylene occurred. The temperature was then slowly raised to about 25° C. and stirring continued for another two hours. Stirring was then discontinued and the catalyst transferred to clean, dry bottles under a nitrogen atmosphere.

The following examples are set forth to illustrate the nature of this invention. However, it should be understood that the examples are set forth for illustrative and not for limitative purposes. The parts and percentages are by weight unless otherwise indicated.

EXAMPLE I

A monomer solution of 8 grams (gms.) of 1,3-butadiene and 2 gms. of isoprene in 40 gms. of dry pentane in a clean, dry four-ounce reaction bottle was employed. To this monomer solution was added 0.015 gms. of vinyl chloride in 0.09 milliliters (ml.) of benzene by means of a microsyringe followed by addition of 0.91 ml. of alfin catalyst solution containing 0.075 gms. of catalyst. The reaction bottle was agitated for 24 hours in a 25° C. polymerization bath. At the end of this time the catalyst was destroyed by adding a phenolic antioxidant dissolved in isopropyl alcohol and the polymer cement dried in a vacuum oven. The yield of dry polymer was 29 percent by weight of initial monomer charged and had an inherent viscosity of 3.62 deciliters (dl.) per gram (dl./gm.) and a gel content of 7%.

In a similar experiment carried out without using any vinyl chloride as the modifier, there is obtained an intrinsic viscosity of about 18 and a gel content of about 50%.

EXAMPLE II

An experiment similar to Example I was performed except 0.005 gm. of vinyl bromide was syringed into the monomer mixture followed by 0.075 gm. of alfin catalyst. After two hours of polymerization at 25° C. the yield of polymer was 20% and the polymer had an intrinsic viscosity of 4.25 and a gel content of 7%.

EXAMPLE III

In an experiment similar to that of Example I except that 0.2 gm. of propenyl chloride was syringed into the monomer mixture followed by 0.15 gm. of alfin catalyst. After a 24 hour polymerization at 25° C., a polymer yield of 32% was obtained. The polymer had an intrinsic viscosity of 3.4 and a gel content of 11%.

EXAMPLE IV

In an experiment similar to that of Example I except 7 gms. of butadiene and 3 gms. of styrene were employed and 0.01 gm. of vinyl bromide was syringed into the monomer mixture followed by 0.125 gm. of alfin catalyst. After 24 hours at 35° C., a yield of polymer of 78% was obtained. This polymer had an intrinsic viscosity of 6.4 and a gel content of 17%.

EXAMPLE V

In an experiment similar to Example I in which 8 gms. of butadiene and 2 gms. of isoprene and 0.01 gm. of vinyl bromide was syringed into the monomer mixture followed by 0.125 gm. of alfin catalyst. After 24 hours at 35° C. an 84% yield of polymer was obtained. The polymer had an intrinsic viscosity of 8.5 and a gel content of 6.5%.

The improvement comprising the polymerization of conjugated diolefin in the presence of unsaturated organic compounds as modifiers is readily apparent from the examples set forth above.

While certain representative embodiments and details have been shown for the purpose of illustrating the invention, it will be apparent to those skilled in the art that various changes and modifications may be made therein without departing from the spirit or scope of the invention.

What is claimed is:

1. In a process for the polymerization of homopolymers of conjugated diolefins or copolymers of more than one conjugated diolefin or copolymers of conjugated diolefins with a monomer selected from the group of styrene, alkyl styrenes, para chloro styrene, or para methoxy styrene, in the presence of an alfin catalyst consisting of an alkali metal halide, a sodium alkoxide and a sodium alkenyl compound, the improvement comprising conducting said polymerizations in the presence of at least one unsaturated olefinic halide from the group of vinyl chloride, vinyl bromide, 1-chloro-1-propene, 1-bromo-1-propene, 1-chloro-1-butene, 1-bromo-1-butene, 1-chloro-1-pentene, 1-bromo-1-pentene, 1-chloro-1-hexene, 1-bromo-1-hexene, 1-chloro-1-heptene, 1-bromo-1-heptene, 1-chloro-1-octene and 1-bromo-1-octene, in amounts varying from 0.001 to about 1.00 part per hundred of monomer as a molecular weight controller.

2. The process according to claim 1 wherein the conjugated diolefinic compound is 1,3-butadiene.

3. The process according to claim 1 wherein the conjugated diolefinic compound is isoprene.

4. The improvement of claim 1 wherein about 0.001 to about 1.0 parts per hundred monomer of the unsaturated organic halide is employed to control molecular weight.

5. The improvement of claim 1 wherein one conjugated diolefinic compound is copolymerized with another conjugated diolefinic compound copolymerizable therewith.

6. A process according to claim 1 wherein the conjugated diolefinic compound is 1,3-butadiene and the copolymerizable conjugated diolefinic compound is isoprene.

7. A process according to claim 1 wherein butadiene-1,3 is copolymerized with styrene.

8. A process according to claim 1 wherein isoprene is copolymerized with styrene.

9. The improvement of claim 1 wherein about 0.01 to about 0.75 parts per hundred monomer of the unsaturated organic halide is employed to control molecular weight.

10. A process for producing a conjugated diolefinic polymer by polymerizing at least one conjugated diolefin monomer or copolymerizing at least one conjugated diolefin monomer with a vinyl aromatic hydrocarbon monomer in a hydrocarbon solvent in the presence of an alfin catalyst and a molecular weight regulator characterized in that said molecular weight regulator is at least one compound selected from the group consisting of vinyl chloride, vinyl bromide, 1-chloro-1-propene, 1-bromo-1-propene, 1-chloro-1-butene, 1-bromo-1-butene, 1-chloro-1-pentene, 1-bromo-1-pentene, 1-chloro-1-hexene, 1-bromo-1-hexene, 1-chloro-1-heptene, 1-bromo-1-heptene, 1-chloro-1-octene and 1-bromo-1-octene and is used in an amount of from 0.001 to about 1.00 part per hundred parts of monomer.

References Cited

UNITED STATES PATENTS

| | | | |
|---|---|---|---|
| 3,423,379 | 1/1969 | Grinninger et al. | 260—94.2 |
| 3,448,093 | 6/1969 | Grinninger et al. | 260—94.2 |
| 3,518,238 | 6/1970 | Onishi et al. | 260—94.2 |
| 3,535,296 | 10/1970 | Broering | 260—94.2 |

FOREIGN PATENTS 782,970   9/1957   Great Britain _____ 260—94.2

JAMES A. SEIDLECK, Primary Examiner

U.S. Cl. X.R.

260—83.7, 94.2 T